(12) United States Patent
Donahue et al.

(10) Patent No.: US 11,875,269 B2
(45) Date of Patent: Jan. 16, 2024

(54) LARGE SCALE GENERATIVE NEURAL NETWORK MODEL WITH INFERENCE FOR REPRESENTATION LEARNING USING ADVERSARIAL TRAINING

(71) Applicant: DeepMind Technologies Limited, London (GB)

(72) Inventors: Jeffrey Donahue, London (GB); Karen Simonyan, London (GB)

(73) Assignee: DeepMind Technologies Limited, London (GB)

( * ) Notice: Subject to any disclaimer, the term of this patent is extended or adjusted under 35 U.S.C. 154(b) by 418 days.

(21) Appl. No.: 16/882,352

(22) Filed: May 22, 2020

(65) Prior Publication Data

US 2020/0372370 A1 Nov. 26, 2020

Related U.S. Application Data

(60) Provisional application No. 62/852,250, filed on May 23, 2019.

(51) Int. Cl.
*G06N 3/088* (2023.01)
*G06N 3/045* (2023.01)

(52) U.S. Cl.
CPC ............. *G06N 3/088* (2013.01); *G06N 3/045* (2023.01)

(58) Field of Classification Search
CPC ... G06K 9/6259; G06F 9/5016; G06F 9/3836; G06F 9/3877; G06N 3/088
USPC .......................................................... 706/20
See application file for complete search history.

(56) References Cited

U.S. PATENT DOCUMENTS

| | | | | |
|---|---|---|---|---|
| 2018/0211303 | A1* | 7/2018 | Chatwin | G06N 20/00 |
| 2019/0080205 | A1* | 3/2019 | Kaufhold | G06N 3/08 |
| 2019/0251612 | A1* | 8/2019 | Fang | G06N 3/084 |
| 2019/0295302 | A1* | 9/2019 | Fu | G06N 3/088 |

OTHER PUBLICATIONS

Boesen et al., "Autoencoding beyond pixels using a learned similarity metric," Proceedings of the 33rd International Conference on Machine Learning, 2016, 48:1558-1566.

Brock et al., "Large Scale GAN Training for High Fidelity Natural Image Synthesis," CoRR, Sep. 2018, https://arxiv.org/abs/1809.11096, 35 pages.

(Continued)

*Primary Examiner* — Gordon G Liu
(74) *Attorney, Agent, or Firm* — Fish & Richardson P.C.

(57) ABSTRACT

Methods, systems, and apparatus, including computer programs encoded on a computer storage medium, for training a generator neural network and an encoder neural network. The generator neural network generates, based on a set of latent values, data items which are samples of a distribution. The encoder neural network generates a set of latent values for a respective data item. The training method comprises jointly training the generator neural network, the encoder neural network and a discriminator neural network configured to distinguish between samples generated by the generator network and samples of the distribution which are not generated by the generator network. The discriminator neural network is configured to distinguish by processing, by the discriminator neural network, an input pair comprising a sample part and a latent part.

25 Claims, 4 Drawing Sheets

(56) References Cited

OTHER PUBLICATIONS

Diederik et al., "Adam: A method for stochastic optimization," CoRR, Dec. 2014, arxiv.org/pdf/1412.6980, 15 pages.
Doersch et al., "Multi-task self-supervised visual learning," Proceedings of the IEEE International Conference on Computer Vision, 2017, pp. 2051-2060.
Doersch et al., "Unsupervised visual representation learning by context prediction," Proceedings of the IEEE International Conference on Computer Vision, 2015, pp. 1422-1430.
Donahue et al., "Adversarial Feature Learning," CoRR, May 2016, https://arxiv.org/abs/1605.09782, 18 pages.
Dosovitskiy et al., "Discriminative unsupervised feature learning with exemplar convolutional neural networks," IEEE Transactions on Pattern Analysis and Machine Intelligence, Sep. 2016, 38(9):1734-1747.
Dugas et al., "Incorporating second-order functional knowledge for better option pricing," Advances in neural information processing systems, Dec. 2001, 7 pages.
Dumoulin et al., "Adversarially Learned Inference," CoRR, Jun. 2016, https://arxiv.org/abs/1606.00704, 18 pages.
Gidaris et al., "Unsupervised representation learning by predicting image rotations," CoRR, Mar. 2018, arxiv.org/abs/1803.07728, 16 pages.
Gomez et al., "The reversible residual network: Backpropagation without storing activations," CoRR, Jul. 2017, arxiv.org/abs/1707.04585, 14 pages.
Goodfellow et al., "Generative adversarial nets," CoRR, Jun. 2014, arxiv.org/abs/1406.2661, 9 pages.
Google. Cloud TPU. https://cloud.google.com/tpu/. Accessed: 2019.
Graves et al., "Associative compression networks," CoRR, Apr. 2018, arxiv.org/abs/1804.02476, 13 pages.
He et al., "Identity mappings in deep residual networks," European Conference on Computer Vision, Sep. 2016, pp. 630-645.
Heusel et al., "GANs trained by a two time-scale update rule converge to a local Nash equilibrium," CoRR, Jun. 2017, arxiv.org/abs/1706.08500, 38 pages.
Ioffe et al., "Batch normalization: Accelerating deep network training by reducing internal covariate shift," Proceedings of the 32nd International Conference on Machine Learning, 2015, 37:448-456.
Karras et al., "A style-based generator architecture for generative adversarial networks," Proceedings of the IEEE/CVF Conference on Computer Vision and Pattern Recognition, 2019, pp. 4401-4410.
Kingma et al., "Auto-encoding variational Bayes," CoRR, Dec. 2013, arxiv.org/abs/1312.6114, 14 pages.
Kingma et al., "Glow: Generative flow with invertible 1×1 convolutions," CoRR, Jul. 2018, arXiv:1807.03039, 15 pages.
Kolesnikov et al., "Revisiting self-supervised visual representation learning," Proceedings of the IEEE/CVF Conference on Computer Vision and Pattern Recognition, 2019, pp. 1920-1929.
Lim et al., "Geometric GAN," CoRR, May 2017, arxiv.org/abs/1705.02894, 17 pages.
Lucic et al., "High-fidelity image generation with fewer labels," Proceedings of the 36th International Conference on Machine Learning, 2019, 97:4183-4192.
Makhzani et al., "Adversarial autoencoders," CoRR, Nov. 2015, arxiv.org/abs/1511.05644, 16 pages.
Miyato et al., "Spectral normalization for generative adversarial networks," CoRR, Feb. 2018, arxiv.org/abs/1802.05957, 26 pages.
Pathak et al., "Learning features by watching objects move," Proceedings of the IEEE Conference on Computer Vision and Pattern Recognition, 2017, pp. 2701-2710.
PCT International Search Report and Written Opinion in International Appln. No. PCT/EP2020/064340, dated Aug. 31, 2020, 18 pages.
Pu et al., "Adversarial Synrnetric Variational Autoencoder," 31st Conference on Neural Information Processing Systems, Nov. 2017, 15 pages.
Radford et al., "Unsupervised representation learning with deep convolutional generative adversarial networks," CoRR, Nov. 2015, arxiv.org/abs/1511.06434, 16 pages.
Rosca et al., "Variational approaches for auto-encoding generative adversarial networks," CoRR, Jun. 2017, arXiv:1706.04987, 21 pages.
Russakovsky et al., "ImageNet Large Scale Visual Recognition Challenge," International Journal of Computer Vision, 2015, pp. 211-252.
Salimans et al., "Improved techniques for training GANs," CoRR, Jun. 2016, arXiv:1606.03498, 10 pages.
Shang et al., "Understanding and improving convolutional neural networks via concatenated rectified linear units," Proceedings of the 33rd International Conference on Machine Learning, 2016, 48:2217-2225.
Tran et al., "Hierarchical implicit models and likelihood-free variational inference," CoRR, Feb. 2017, arxiv.org/abs/1702.08896, 15 pages.
Ulyanov et al., "It takes (only) two: Adversarial generator-encoder networks," Thirty-Second AAAI Conference on Artificial Intelligence, Apr. 2018, 32(1):1250-1257.
Van den Oord et al., "Neural discrete representation learning," CoRR, Nov. 2017, arXiv:1711.00937, 11 pages.
Van den Oord et al., "Representation learning with contrastive predictive coding," CoRR, Jul. 2018, arxiv.org/abs/1807.03748, 13 pages.
Zhang et al., "Colorful image colorization," European Conference on Computer Vision, Sep. 2016, 29 pages.
Zhang et al., "Split-brain autoencoders: Unsupervised learning by cross-channel prediction," Proceedings of the IEEE Conference on Computer Vision and Pattern Recognition, 2017, pp. 1058-1067.
International Preliminary Report on Patentability in International Appln. No. PCT/EP2020/064340, dated Dec. 2, 2021, 12 pages.

* cited by examiner

LARGE SCALE GENERATIVE NEURAL NETWORK MODEL WITH INFERENCE FOR REPRESENTATION LEARNING USING ADVERSARIAL TRAINING

CROSS-REFERENCE TO RELATED APPLICATION

This application claims priority to U.S. Provisional Application No. 62/852,250, filed on May 23, 2019. The disclosure of the prior application is considered part of and is incorporated by reference in the disclosure of this application.

BACKGROUND

This specification relates to methods and systems for training large scale generative neural networks together with encoding neural networks for performing inference.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification generally describes how a system implemented as computer programs in one or more computers in one or more locations can perform a method to train (that is, adjust the parameters of) an adaptive system which is a Generative Adversarial Network (GAN) that includes an inference model comprising a generator neural network, an encoder neural network and a discriminator neural network. The neural networks are trained, based on a training set of data items selected from a distribution. The generator neural network, once trained, may be used to generate samples from the distribution based on latent values (or simply "latents") selected from a latent value distribution (or "latent distribution"). The encoder neural network, once trained, may be used to generate latent values from the latent value distribution based on data items selected from the distribution. That is, the encoder neural network may be considered to implement the reverse function of the generator neural network.

More specifically, this specification relates to a computer-implemented method of training a generator neural network and an encoder neural network. The generator neural network may be configured to generate, based on a set of latent values, data items which are samples of a distribution representing a set of training data items. The encoder neural network may be configured to generate a set of latent values for a respective data item. The training method may comprise jointly training the generator neural network, the encoder neural network and a discriminator neural network configured to distinguish between samples generated by the generator network and samples of the distribution which are not generated by the generator network. The discriminator neural network may be configured to distinguish by processing, by the discriminator neural network, an input pair comprising a sample part and a latent part. The sample and latent parts of the input pair may comprise either a sample of the distribution generated by the generator neural network and the corresponding set of latent values used to generate the sample respectively, or a training data item of the set of training data items and a set of latent values generated by the encoder neural network based upon the training data item. The training may be based upon a loss function comprising a joint discriminator loss term based upon the sample and latent parts of the input pair processed by the discriminator neural network and at least one single discriminator loss term based upon only one of the sample or latent parts of the input pair.

In implementations, by training a generator neural network and an encoder neural network using a loss function comprising both a joint discriminator loss term based upon an input pair processed by a discriminator neural network and a single discriminator loss term based upon only one of the sample or latent parts of an input pair, it has been found that large scale generator and encoder neural networks can be trained effectively. This may allow large scale data to be processed more effectively than in known methods. In particular, examples of the encoder have been found experimentally to be better than known methods at extracting salient information from data items, e.g., to be used by a classification system or other purposes such as controlling an agent. The generator has been found to be better than known techniques at generating data items which are recognized by users as realistic. It has also been found that the use of the loss function comprising both a joint discriminator loss term based upon an input pair processed by a discriminator neural network and a single discriminator loss term based upon only one of the sample or latent parts of the input pair provides a more stable training process than some known techniques, which allows efficient training of large scale generative and inference neural networks.

The training method may also comprise the following optional features.

The single discriminator loss term may be based upon the sample part of the input pair. The single discriminator loss term may comprise a sample discrimination score generated based upon processing the sample part of the input pair using a sample discriminator sub-network. The sample discrimination score may indicate the likelihood that the sample part of the input pair is a sample generated by the generator neural network or is genuine training data item of the set of training data items. In this regard, the sample discrimination score may be a probability.

The sample discriminator sub-network may be based upon a convolutional neural network. For example, the sample discriminator sub-network may be based upon the discriminator network from the "BigGAN" framework (Andrew Brock, Jeff Donahue, and Karen Simonyan. "Large scale GAN training for high fidelity natural image synthesis", in ICLR, 2019, arXiv 1809:11096, the disclosure of which is incorporated herein by reference).

The sample discrimination score may be further generated based upon applying a projection to the output of the sample discriminator sub-network. For example, the projection may be implemented as a further linear neural network layer which may have trainable parameters to be trained using the described training method. The single discriminator loss term may be based upon the latent part of the input pair.

The single discriminator loss term comprises a latent discrimination score generated based upon processing the latent part of the input pair using a latent discriminator sub-network. The latent discrimination score may indicate the likelihood that latent part of the input pair is a set of latent values generated based upon a training data item using the encoding neural network or is a set of latent values correspondent to a sample generated using the generator neural network. In this regard, the latent discrimination score may be a probability.

The latent discrimination score may be further generated based upon applying a projection to the output of the latent discriminator sub-network. For example, the projection may be implemented as a further linear neural network layer which may have trainable parameters to be trained using the described training method.

The latent discriminator sub-network may be based upon a multi-layer perceptron. For example, the latent discriminator sub-network may be a "ResNet" type of neural network comprising residual blocks and skip connections.

The loss function may comprise a plurality of single discriminator loss terms. For example, the loss function may comprise both the sample discrimination score and the latent discrimination score.

The joint discriminator loss term may comprise a joint discrimination score generated using a joint discriminator sub-network. The joint discrimination score may indicate the likelihood that the input pair comprises a sample of the distribution generated by the generator neural network and the corresponding set of latent values used to generate the sample respectively, or a training data item of the set of training data items and a set of latent values generated by the encoder neural network based upon the training data item.

The joint discriminator sub-network may be configured to process the input pair. Alternatively, the joint discriminator sub-network may be configured to process the output of a sample discriminator sub-network and the output of a latent discriminator sub-network, wherein the sample discriminator sub-network is configured to process the sample part of the input pair and the latent discriminator sub-network is configured to process the latent part of the input pair. The sample discriminator sub-network and the latent discriminator sub-network may be the same as that described above.

The joint discrimination score may be further generated based upon applying a projection to the output of the joint discriminator sub-network. For example, the projection may be implemented as a further linear neural network layer which may have trainable parameters to be trained using the described training method.

The joint discriminator sub-network may be based upon a multi-layer perceptron. For example, the joint discriminator sub-network may be a "ResNet" type of neural network comprising residual blocks and skip connections.

The loss function may be based upon a summation of the joint discriminator loss term and the single discriminator loss term. It will be appreciated that where there exists a plurality of single discriminator loss terms, the summation may include all of the single discriminator loss terms or a subset of the single discriminator loss terms.

The loss function may comprise a hinge function applied to a component of the loss function (e.g., to one of the scores or the negative of one of the score). A hinge function may be defined as $h(t)=\max(0, 1-t)$. The hinge function may be applied to a component of the loss function individually or may be applied to a summation of the components of the loss function or to any combination of individual and aggregate loss function components.

The encoder neural network may represent a probability distribution and generating a set of latent values may comprise sampling from the probability distribution. In this way, the encoder neural network is non-deterministic. The output of the encoder neural network may comprise a mean and standard deviation for defining a normal probability distribution from which the set of latent values may be sampled.

The encoder neural network may comprise a final neural network layer implementing a non-negative "soft-plus" non-linearity for generating the standard deviation. The "soft-plus" non-linearity may be defined as $\log(1+\exp(x))$. The set of latent values may be generated based upon a reparameterized sampling. For example, a latent value z, may be generated as z=mean+epsilon*standard deviation, with epsilon being sampled from a unit Gaussian having zero mean. Alternatively, the latent values may be based upon a discrete probability distribution.

The encoder neural network may be based upon a convolutional neural network. For example, the encoder neural network may be a "ResNet" or a "RevNet" type of neural network having standard residual blocks or reversible residual blocks with further fully connected layers having skip connections.

The generator neural network may be a large scale deep neural network and may, for example, be based upon the "BigGAN" framework. The generator neural network may generate samples either unconditionally or conditionally.

The training may further comprise alternating updates of the discriminator neural network parameters and updates of the encoder neural network parameters and generator neural network parameters wherein the updates are generated based upon the loss function.

In general, training follows the GAN framework. Training is an iterative process with each iteration based upon a mini-batch of samples used to determine a value of the loss function from which neural network parameter updates may be determined using gradient descent and backpropagation.

The training further may further comprise jointly updating the encoder neural network parameters and generator neural network parameters.

Alternating the updates of the discriminator neural network parameters and updates of the encoder neural network parameters and generator neural network parameters may comprise performing a plurality of updates of the discriminator neural network parameters followed by an update of the encoder neural network parameters and generator neural network parameters. For example, training may comprise two updates of the discriminator neural network parameters followed be a joint update of the encoder and generator neural network parameters.

In some implementations the latent values may include a categorical variable, e.g., by concatenating the latent values with a categorical variable, e.g., a 1024-way categorical. In this way the generator neural network may learn a clustering of the data items and the encoder neural network may learn to classify the data items (making predictions in the embedding space rather than the latent variables space itself).

There is also described a method of performing inference using an encoder neural network, the method comprising: processing an input data item using the encoder neural network to generate a set of latent values representing the input data item. The encoder neural network is jointly trained with a generator neural network configured to generate, based on a set of latent values, data items which are samples of a distribution representing a set of training data items, and a discriminator neural network configured to distinguish between samples generated by the generator network and samples of the distribution which are not generated by the generator network. The discriminator neural network is configured to distinguish by processing, by the discriminator neural network, an input pair comprising a sample part and a latent part. The sample and latent parts of the input pair comprises either a sample of the distribution generated by the generator neural network and the corresponding set of latent values used to generate the sample respectively, or a training data item of the set of training data items and a set of latent values generated by the encoder neural network based upon the training data item. The training is based upon a loss function comprising a joint discriminator loss term based upon the sample and latent parts of the input pair processed by the discriminator neural network and a single discriminator loss term based upon only one of the sample or latent parts of the input pair. The training may be carried out in accordance with the procedures described above.

In general terms, inference is the process of determining the latent values that describe a particular input data item.

The method may further comprise classifying the input data item based upon the latent values representing the input data item. For example, a classifier may be trained using the output of the encoder neural network as a representation of input data items for classification. The classifier may be a linear classifier or other type of classifier.

The method may further comprise performing an action with an agent based upon the latent values representing the input data item.

Latent values generated from a data item by the trained encoder neural network may be used in classification of data, for example as part of an image or audio signal processing classification system. The latent values generated from a data item provide a representation of the data item. A plurality of data items may be processed by the trained encoder neural network to generate latent values and may, for example, be used to train a classifier. For example, the data items used to train the classifier may be labelled with respective labels of a plurality of labels and the classifier may be trained to classify the latent value representation generated from an unclassified data item with one of the plurality of labels.

Latent values generated by the trained encoder neural network may additionally or alternatively be used to search for data items that are similar to a provided query data item. For example, latent values may be generated and stored for each of a plurality of stored data items. The stored data items may subsequently be queried using a query data item by generating latent values for the query data item and searching the data items based upon the latent values stored for the stored data items and the latent values for the query data item. The search may, for example, be based upon a similarity measure, or the search may use a neural network trained based upon the stored data items.

The classification system may provide classification of any suitable data items and may, for example be for classifying/finding/recommending an audio segment, image, video, or product, e.g., based upon an input sequence which may represent one or more query images, videos, or products.

The data items may be data representing a still or moving image (i.e., a sequence of images), in which case individual numerical values contained in the data item may represent pixel values, for example values of one or more color channels of the pixels. The training images used for training the neural networks may be images of the real world, captured by a camera.

Alternatively the data item may be data representing a sound signal, for example amplitude values of an audio waveform (e.g., a natural language; the training examples in this case may be samples of natural language, e.g., recorded by a microphone from speech by human speakers). In another possibility, the data item may be text data, for example a text string or other representation of words and/or sub-word units (wordpieces) in a machine translation task. Thus the data item may be one, two, or higher-dimensional.

Alternatively, the latent values may define a text string or spoken sentence, or an encoding of these, and the generator neural network may generate an image corresponding to the text or speech (text to image synthesis). In principle, the situation may be vice versa, with the data items being images and the latent values representing text strings or spoken sentences. Alternatively the latent values may define a text string or spoken sentence, or an encoding of these, and the generator network may then generate a corresponding text string or spoken sentence in a different language.

Particularly in the case that the data items are sequences of data (e.g., video sequences), the generator may also generate the data items (e.g., videos) autoregressively, in particular given one or more previous video frames.

The generator network may generate sound data, for example speech, in a similar way. This may be conditioned upon audio data and/or other data such as text data. In general the target data may define local and/or global features of the generated data item. For example for audio data, the generator neural network may generate a sequence of outputs based on a series of target data values. For example, the target data may comprise global features (the same when the generator network is to generate a sequence of data items), which may comprise information defining the sound of a particular person's voice, or a speech style, or a speaker identity, or a language identity. The target data may additionally or alternatively comprise local features (i.e., not the same for the sequence of data items) which may comprise linguistic features derived from input text, optionally with intonation data.

In another example the target data may define motion or state of a physical object, for example actions and/or states of a robot arm. The generator neural network may then be used to generate a data item predicting a future image or video sequence seen by a real or virtual camera associated with the physical object. In such an example the target data may include one or more previous image or video frames seen by the camera. This data can be useful for reinforcement learning, for example facilitating planning in a visual environment. More generally the system learns to encode a probability density (i.e., the distribution) which may be used directly for probabilistic planning/exploration.

The generator neural network may be employed for image processing tasks such as de-noising, de-blurring, image completion and the like by employing target data defining a noisy or incomplete image. The encoder neural network may be employed for image compression. The system may similarly be used to process signals representing other than images.

The input target data and output data item may in general be any kind of digital data. Thus in another example the input target data and output data item may each comprise tokens defining a sentence in a natural language. The generator neural network may then be used, for example, in a system for machine translation or to generate sentences representing a concept expressed in the latent values and/or additional data. The latent values may additionally or alternatively be used to control a style or sentiment of the generated text. In still further examples the input and output data item may comprise speech, video, or time series data generally.

The generator neural network may be used to generate further examples of data items for training another machine learning system. The generator network may be used generate new data items similar to those in a training data set.

The set of latent values may be determined by sampling from the latent distribution of latent values. If the generator network has been trained conditioned on additional data, e.g., labels, new data items may be generated conditioned on additional data e.g., a label provided to the generator network. In this way additional labelled data items may be generated, for example to supplement a dearth of unlabeled training data items.

The neural network can be configured to receive any kind of digital data input and to generate any kind of score, classification, or regression output based on the input.

For example, if the inputs to the neural network are images or features that have been extracted from images, the output generated by the neural network for a given image may be scores for each of a set of object categories, with each score representing an estimated likelihood that the image contains an image of an object belonging to the category.

As another example, if the inputs to the neural network are Internet resources (e.g., web pages), documents, or portions of documents or features extracted from Internet resources, documents, or portions of documents, the output generated by the neural network for a given Internet resource, document, or portion of a document may be a score for each of a set of topics, with each score representing an estimated likelihood that the Internet resource, document, or document portion is about the topic.

As another example, if the inputs to the neural network are features of an impression context for a particular advertisement, the output generated by the neural network may be a score that represents an estimated likelihood that the particular advertisement will be clicked on.

As another example, if the inputs to the neural network are features of a personalized recommendation for a user, e.g., features characterizing the context for the recommendation, e.g., features characterizing previous actions taken by the user, the output generated by the neural network may be a score for each of a set of content items, with each score representing an estimated likelihood that the user will respond favorably to being recommended the content item.

As another example, if the input to the neural network is a sequence of text in one language, the output generated by the neural network may be a score for each of a set of pieces of text in another language, with each score representing an estimated likelihood that the piece of text in the other language is a proper translation of the input text into the other language.

As another example, if the input to the neural network is a sequence representing a spoken utterance, the output generated by the neural network may be a score for each of a set of pieces of text, each score representing an estimated likelihood that the piece of text is the correct transcript for the utterance.

The subject matter described in this specification can be implemented in particular embodiments so as to realize one or more of the following advantages.

In general, generative adversarial networks are not capable of performing inference without modification. The present disclosure trains an encoder neural network that is capable of implementing the reverse operation of the generator neural network (i.e., inference) and as such, the encoder neural network is able to generate a set of latent values that is representative of a data item. The set of latent values may be used other tasks such as classification or in the control of agent, such as in a reinforcement learning system.

In addition, by jointly training the generator neural network and the encoder neural network in this way, the generated latent values are more effective at capturing important variations in the data distribution rather than trivial variations such as pixel-wise differences. This enables improved accuracy in downstream tasks such as the above-mentioned classification tasks.

The training method also enables the use of larger scale generator and encoder neural networks which can model more complex data distributions. In particular, the loss function comprising both a joint discriminator loss term a single discriminator loss term enables large scale generator and encoder neural networks to be trained effectively and efficiently. Given the overall improved training speed, the training method requires fewer computational resources such as processor time and power usage to complete training.

The training method may also be carried out using only unlabeled data and does not require corrupting the data in any way as in self-supervised methods.

The training method may also be carried out using a distributed system, for example, the generator neural network, encoder neural network and discriminator neural network may reside on different processing systems of the distributed system and be trained in parallel.

In implementations the latent values can provide a representation of the data items on which the system was trained which tend to capture the high level semantics of the data items rather than their low level detail, the training encouraging the encoder neural network to model the former more than the latter. Thus the latent values may naturally capture the "categories" of the data items, despite being trainable using unlabeled data. This vastly expands the amount of training data items potentially available, and hence the detailed semantics which may be captured.

Once trained the latent values may be re-used by a subsequent system for a subsequent task, which may be substantially simplified because a useful semantic representation is already available. As described above, the subsequent system may be configured to perform almost any task including, but not limited to, an image processing or vision task, a classification task, and a reinforcement learning task. As previously described some such subsequent systems would normally require labelled training data items and may be further trained using labelled training data to fine-tune the latent value representations already derived using unlabeled training data. Such systems may learn faster, using less memory and/or computing resources, and may ultimately perform better by using the systems and methods described herein to determine latent value representations on which they can work.

In some implementations a system/method as described above may provide a latent value representation to a subsequent reinforcement learning system. For example such a reinforcement learning system may be used to train an agent policy neural network through reinforcement learning for use in controlling an agent to perform a reinforcement learning task while interacting with an environment. For example in response to an observation the reinforcement learning system may select an action to be performed by the agent and cause the agent to perform the selected action. Once the agent has performed the selected action, the environment transitions into a new state and the reinforcement learning system may receive a reward, in general a numerical value. The reward may indicate whether the agent has accomplished the task, or the progress of the agent towards accomplishing the task. For example, if the task specifies that the agent should navigate through the environment to a goal location, then the reward at each time step may have a positive value once the agent reaches the goal location, and a zero value otherwise. As another example, if the task specifies that the agent should explore the environment, then the reward at a time step may have a positive value if the agent navigates to a previously unexplored location at the time step, and a zero value otherwise.

In some of these implementations, the environment is a real-world environment and the agent is a mechanical agent interacting with the real-world environment, e.g., a robot or an autonomous or semi-autonomous land, air, or sea vehicle navigating through the environment.

In these implementations, the observations may include, e.g., one or more of: images, object position data, and sensor data captured as the agent interacts with the environment, for example sensor data from an image, distance, or position sensor, or data from an actuator.

For example in the case of a robot the observations may include data characterizing a current state of the robot, e.g., one or more of: joint position, joint velocity, joint force, torque or acceleration, e.g., gravity-compensated torque feedback, and global or relative pose of an item held by the robot. In the case of a robot or other mechanical agent or vehicle the observations may similarly include one or more of the position, linear or angular velocity, force, torque or acceleration, and global or relative pose of one or more parts of the agent. The observations may be defined in 1, 2 or 3 dimensions, and may be absolute and/or relative observations. The observations may also include, for example, sensed electronic signals such as motor current or a temperature signal; and/or image or video data for example from a camera or a LIDAR sensor, e.g., data from sensors of the agent or data from sensors that are located separately from the agent in the environment.

In these implementations, the actions may be control inputs to control the robot, e.g., torques for the joints of the robot or higher-level control commands, or an autonomous or semi-autonomous land, air, sea vehicle, e.g., torques to the control surface or other control elements of the vehicle or higher-level control commands. In other words, the actions can include for example, position, velocity, or force/torque/acceleration data for one or more joints of a robot or parts of another mechanical agent. Action data may additionally or alternatively include electronic control data such as motor control data, or more generally data for controlling one or more electronic devices within the environment the control of which has an effect on the observed state of the environment. For example in the case of an autonomous or semi-autonomous land or air or sea vehicle the actions may include actions to control navigation, e.g., steering, and movement e.g., braking and/or acceleration of the vehicle.

In some other implementations the environment is a simulated environment and the agent is implemented as one or more computers interacting with the simulated environment. The simulated environment may be a motion simulation environment, e.g., a driving simulation or a flight simulation, and the agent may be a simulated vehicle navigating through the motion simulation. In these implementations, the actions may be control inputs to control the simulated user or simulated vehicle. In a similar way a robot reinforcement learning system may be partially or wholly trained in simulation before use on a real-world robot. In another example, the simulated environment may be a video game and the agent may be a simulated user playing the video game. Generally, in the case of a simulated environment, the observations may include simulated versions of one or more of the previously described observations or types of observations and the actions may include simulated versions of one or more of the previously described actions or types of actions.

In the case of an electronic agent the observations may include data from one or more sensors monitoring part of a plant or service facility such as current, voltage, power, temperature and other sensors and/or electronic signals representing the functioning of electronic and/or mechanical items of equipment. In some other applications the agent may control actions in a real-world environment including items of equipment, for example in a data center, in a power/water distribution system, or in a manufacturing plant or service facility. The observations may then relate to operation of the plant or facility. For example the observations may include observations of power or water usage by equipment, or observations of power generation or distribution control, or observations of usage of a resource or of waste production. The actions may include actions controlling or imposing operating conditions on items of equipment of the plant/facility, and/or actions that result in changes to settings in the operation of the plant/facility, e.g., to adjust or turn on/off components of the plant/facility.

BRIEF DESCRIPTION OF THE DRAWINGS

Like reference numbers and designations in the various drawings indicate like elements.

DETAILED DESCRIPTION

Figure 1:
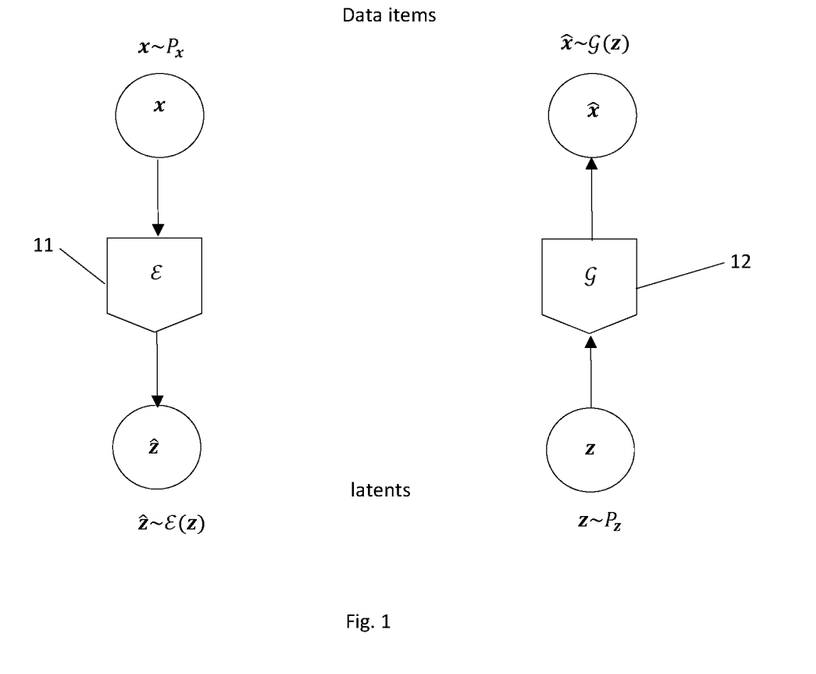
FIG. 1 shows an encoder and a generator which can be trained.

FIG. 1 illustrates schematically an encoder neural network 11 ("encoder") and a generator neural network 12 ("generator") which can be trained by a training method as disclosed here. The method employs a training database comprising many instances of data items (e.g., images or sections of sound or text). Each data item is denoted by a respective vector x (i.e., a set composed of a plurality of data values). The data items have a distribution $P_x$.

The encoder 11 is a neural network defined by a plurality of numerical network parameters which are adjusted during the training of the encoder 11. The encoder 11 performs a function $\hat{z}=\mathcal{E}(x)$, defined at any time by the current values of the set of network parameters, to generate an output $\hat{z}$ which is a set of latent values, i.e., a plurality of latent values. The number of elements in x is typically the same for all data items, and may be denoted by N which is an integer greater than one. Similarly, the number of latent values in $\hat{z}$ is typically the same for all sets of latent values, and may be denoted n. N may be greater (e.g., at least a factor of 10 greater, and typically at least 1000 times greater) than the number of latent values n in $\hat{z}$. For example, in the case that each data item is an image composed of one or more values for each of at least 10,000 pixels, and the number n of latent values in $\hat{z}$ may be less than 1000, or less than 200. Denoting the network parameters of the encoder 11 by Y, the encoder 11 can also be denoted $\hat{z}=\mathcal{E}_y(x)$.

The generator 12 defined by a plurality of numerical network parameters which are adjusted during the training of the generator 12. The generator 12 receives as input a set of latent values ("latents"). The set of latent values comprises a plurality of latent values, and is denoted by the vector z. Typically, the number of latent values in z is equal to n, which is an integer greater than one. The set of latents are drawn from a distribution $P_z$. For example, the distribution may be the same for each component of z, and may be a simple continuous distribution, such as an isotropic Gaussian $\mathcal{N}(0,1)$. The generator 12 performs a function denoted $\hat{x}=\mathcal{G}(z)$, defined at any time by the current values of the set of network parameters, to generate a data item $\hat{x}$. Denoting the network parameters of the generator 11 by $\Xi$, the encoder 11 can also be denoted $\hat{x}=\mathcal{G}_\Xi(z)$.

The generator 12 models a conditional distribution P(x|z) of data items x given latent inputs z sampled from the latent prior $P_z$. The encoder 11 models the inverse conditional distribution P(z|x), predicting latents z given data item x sampled from the data distribution $P_x$. In experimental implementations of the present disclosure, the encoder 11 and generator 12 were realized using the generator and discriminator architectures from the "BigGAN" framework.

As in the BiGAN (Bidirectional GAN) framework (Jeff Donahue, Philipp Krähenbühl, and Trevor Darrell, "Adversarial feature learning", in ICLR, 2017, at arXiv: 1605.09782, and Vincent Dumoulin, Ishmael Belghazi, Ben Poole, Olivier Mastropietro, Alex Lamb, Martin Arjovsky, and Aaron Courville, "Adversarially Learned Inference", in ICLR, 2017, at arXiv:1606.00704) the disclosure of which is incorporated herein by reference), according to this example of the present disclosure the encoder 11 and the generator 12 are trained using a discriminator neural network ("discriminator") which takes as input a data item-latents pair (also referred to here as an "input pair" of the discriminator). The input pairs the discriminator receives at different time can be (e.g., in alternation) data item-latents pairs (x, $\hat{z}$) representing an input x to the encoder and the corresponding output $\hat{z}$, or data item-latents pairs ($\hat{x}$, z) representing an input z to the generator 12 and the corresponding output $\hat{x}$. Thus, a "sample part" of each pair is x or $\hat{x}$, and a "latent part" of each pair is respectively $\hat{z}$ or z. The discriminator learns to discriminate between pairs (x, $\hat{z}$) from the data distribution $P_x$ and the encoder 11, versus pairs ($\hat{x}$, z) from the generator 12 and the latent distribution $P_z$. Concretely, the inputs to the discriminator are pairs (x~$P_x$, $\hat{z}$~$\mathcal{E}(x)$) and ($\hat{x}$~$\mathcal{G}(z)$, z~$P_z$). The encoder 11 and the generator 12 are trained to "fool" the discriminator by making the two joint distributions $P_{x,\mathcal{E}(x)}$ and $P_{\mathcal{G}(z),z}$, from which respectively the two types of data item-latents pairs are sampled, indistinguishable.

The training is performed using a training data database of training data items x, such that $P_x$ represents the distribution of x over the training data items in the training data database (e.g., in the case that the data items are images, a database of example images; the example images may be images of the real world captured with one or more cameras, or alternatively synthetic images generated by a computer). That is, the generator 12 is configured to generate, based on the set of latent values z, data items $\hat{x}$ which are samples of the distribution $P_x$ representing the database of training data items.

Figure 2:
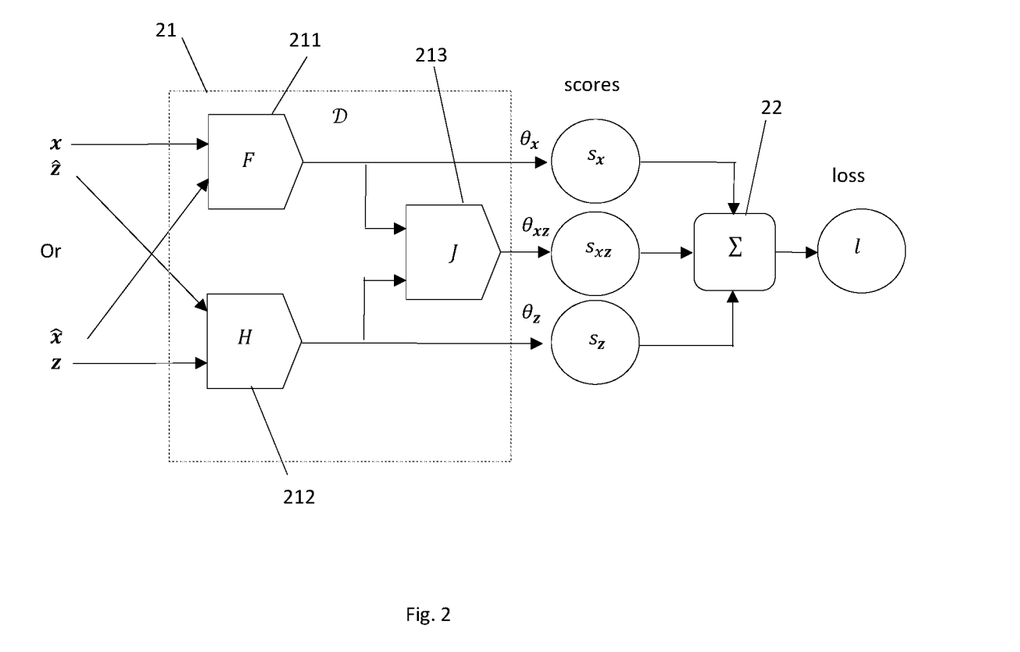
FIG. 2 shows a discriminator which is used in an example of some of the principles of this disclosure to train the encoder and generator of FIG. 1.

A possible discriminator 21 as proposed by the present disclosure is illustrated in FIG. 2, and is different from the discriminator employed in BiGAN. It receives successive data item-latents pairs, each of which is either a pair (x, $\hat{z}$) from the data distribution $P_x$ and the encoder 11, or a pair ($\hat{x}$, z) from the generator 12 and the latent distribution $P_z$. For example, the discriminator may receive a data item-latents pair of each type alternately; or successively a batch of multiple data item-latents pairs of one type, and then successively a batch of multiple data item—latents pairs of the other type.

The discriminator 21 comprises a sample discriminator sub-network 211, which receives depending upon which type of data item-latents pair is input to the discriminator 21, (only) either the sample $\hat{x}$ generated by the generator network 12, or the training data item x.

That is, the sample discriminator network 211 does not receive the sets of latent values z and $\hat{z}$, or data based on them. The sample discriminator sub-network 211 performs a function denoted $F_\Psi$, defined, at any time, by the current values of a set of trainable numerical network parameters $\Psi$. A projection $\theta_x$ (which may be thought of a linear neural network layer with network parameters given by $\theta_x$) is applied to the output of the sample discriminator sub-network 211 to produce a unary (one component) sample discrimination score denoted $s_x$ (for both types of data item-latents pair). Particularly in the case that the data items are images, the sample discriminator sub-network 211 may be implemented as a neural network having one or more input layers which are a convolutional neural network.

The discriminator 21 comprises a latent discriminator sub-network 212, which receives, depending upon which type of data item-latents pair is input to the discriminator 21, (only) either the set of latent values z used by the generator 12 to generate the sample $\hat{x}$, or a set of latent values $\hat{z}$ generated by the encoder 11 based on the training data item x. That is, the latent discriminator network 212 does not receive the samples $\hat{x}$ and the training data items x, or data based on them. The latent discriminator sub-network 212 performs a function denoted $H_\Phi$ defined, at any time by the current values of a set of trainable numerical network parameters $\Phi$. A projection $\theta_z$ (a linear neural network layer) is applied to the output of the latent discriminator sub-network 212 to produce a unary latent discrimination score denoted $s_z$ (for both types of data item-latents pair). The latent discriminator sub-network 212 may optionally be implemented as a perceptron, such as a multilayer perceptron.

The discriminator 21 further comprises a joint discriminator sub-network 213, which receives the outputs of the sample discriminator sub-network 211 and the latent discriminator sub-network 212. The joint discriminator sub-network 213 performs a function denoted $J_\Theta$ defined, at any time, by the current values of a set of trainable numerical network parameters $\Theta$. A projection $\theta_{xz}$ (a linear neural network layer) is applied to the output of the joint discriminator sub-network 212 to produce a unary joint discrimination score denoted $s_{xz}$ (for both types of data item-latents pair). The joint discriminator sub-network 213 may optionally be implemented as a perceptron, such as a multilayer perceptron.

The three scores $s_{xz}$, $s_x$ and $s_z$ are summed by a summation unit 22 to produce a loss value (or "loss") denoted l. Thus, calculation of the loss l employs (i) the unary sample score $s_x$ which is based only on the sample part of the input pair and which, of adaptive networks 211, 212, 213 of the discriminator 21, depends only on the output of the sample discriminator network 211, (ii) the unary latent score $s_z$ which is based only on the latent part of the input pair and which, of adaptive networks 211, 212, 213 of the discriminator 21, depends only on the output of the latent discriminator network 212, and (iii) the joint score $s_{xz}$, which links the data and latent distributions and is based on both the sample and latent parts of the input pair, and upon the outputs of all three adaptive networks 211, 212, 213.

Loss function(s) used to perform the training may be generated from the loss values generated by the summation unit 22. In calculating the loss value, the summation unit 22 may apply to the result of the summation a different sign according to the type of the input pair (i.e., whether it is a sample of the distribution generated by the generator neural network and the corresponding set of latent values used to generate the sample respectively, or alternatively a training data item of the set of training data items and a set of latent values generated by the encoder neural network based upon the training data item). Optionally, in certain cases, the loss value may be modified using a hinge function ("hinge") prior to or after the summation.

Concretely, a discriminator loss function ("discriminator loss") $\mathcal{L}_D$ and a encoder-generator loss function $\mathcal{L}_{\in \mathcal{G}}$ are defined as follows, based on the scalar discriminator score functions $s_{xz}$, $s_x$ and $s_z$ and corresponding per-sample losses $l_D$ and $l_{\in \mathcal{G}}$:

$$s_x(x) = \theta_x^T F_\Psi(x)$$

$$s_z(z) = \theta_z^T H_\Phi(z)$$

$$s_{xz}(x, z) = \theta_{xz}^T J_\Theta(F_\Psi(x), H_\Phi(z))$$

$$l_{\in \mathcal{G}}(x, z, y) = y(s_x(x) + s_z(z) + s_{xz}(x, z))$$

$$\mathcal{L}_{\in \mathcal{G}}(P_x, P_z) = \mathcal{L}_{x \sim P_x, \hat{z} \sim \gamma(x)}[l_{\in \mathcal{G}}(x, \hat{z}, +1)] + \mathcal{L}_{z \sim P_z, \hat{x} \sim \Xi(z)}[l_{\in \mathcal{G}}(\hat{x}, z, -1)]$$

$$l_D(x, z, y) = h(y s_x(x)) + h(y s_z(z)) + h(y s_{xz}(x, z))$$

$$\mathcal{L}_D(P_x, P_z) = \mathcal{L}_{x \sim P_x, \hat{z} \sim \gamma(x)}[l_D(x, \hat{z}, +1)] + \mathcal{L}_{z \sim P_z, \hat{x} \sim \Xi(z)}[l_D(\hat{x}, z, -1)]$$

where y is either −1 or +1 (i.e., $y \in \{-1, +1\}$) and $h(t) = \max(0, 1-t)$ is a "hinge" optionally used to regularize the discriminator. The hinge can be considered as modifying the operation of the summation unit 22 in the case of calculating the loss $l_D$. Thus, both the loss functions $\mathcal{L}_D$ and $\mathcal{L}_{\in \mathcal{G}}$ have two single discriminator loss terms based respectively on expectation values of the unary sample scores $s_{xz}$ and $s_z$ (which are each based upon only one of the sample or latent parts of the input pair), and a joint discriminator loss term based on the expectation value of the joint score $s_{xz}$ (which is based upon the sample and latent parts of the input pair processed by the discriminator neural network). In the case of the discriminator loss function, the expectation values are calculated taking into account the hinge.

The respective sets of network parameters Y and $\Xi$ of $\in$ and $\mathcal{G}$ are optimized to minimize the loss function $\mathcal{L}_{\in \mathcal{G}}$, and the projections, $\theta_x$, $\theta_z$ and $\theta_{xz}$ and the respective sets of network parameters $\Psi$, $\Phi$ and $\Theta$ of F, H and J are optimized to minimize loss function $\mathcal{L}_D$. The expectations $\mathcal{L}$ are estimated by Monte Carlo samples taken over mini-batches.

Note that an alternative discriminator loss which may be used in place of $l_D$ invokes the "hinge" h just once on the sum of the three loss terms (i.e., $l'_D(x, z, y) = h(y(s_x(x) + s_z(z) + s_{xz}(x, z)))$. However, experimentally it was found that this performed less well than $l_D$ as defined above which clamps each of the three loss terms separately.

It was found experimentally that the discriminator 21 leads to better representation learning results (e.g., as compared to BiGAN) without compromising generation. The unary single discriminator scores $s_x$ and $s_z$ guide optimization in the "right direction" by explicitly enforcing the property that the marginal distributions for x and z match at the global optimum (i.e., the distribution of latents generated by the encoder 11 matches $P_z$, and the distribution of data items produced by the generator 12 matches $P_x$). For example, in the context of image generation, the unary loss term on x matches a loss used by the GAN algorithm and provides a learning signal which steers only the generator 12 to match the image distribution $P_x$ independently of its latent inputs.

Several variations of the discriminator 21 are possible according to this disclosure. For example, the joint discriminator sub-network 213 may receive directly (i.e., substantially without prior modification, e.g., by an adaptive component) either, depending upon which type of data item-latents pair is input to the discriminator 21, the sample $\hat{x}$ generated by the generator network 12 and the set of latent values z used by the generator 12 to generate the sample the sample $\hat{x}$, or the training data item x and the set of latent values $\hat{z}$ generated by the encoder 11 based on the training data item x. Thus, the joint discriminator sub-network 213 receives the data item-latents pairs directly, rather than via the single discriminator sub-networks 211, 212.

In further variations, the loss terms based on either of the single discriminator scores $s_x$ and $s_z$ may be omitted from the loss function. Optionally, in this case the corresponding one of the sample discriminator sub-network 211 or the latent discriminator subnetwork 212 may be omitted from the discriminator 21. In this case, the joint discriminator sub-network 213 may receive directly (i.e., substantially without prior modification, e.g., by an adaptive component) the corresponding one of (i) the samples $\hat{x}$ and the training data items x, or (ii) the sets of latent values z and $\hat{z}$.

Figure 3:
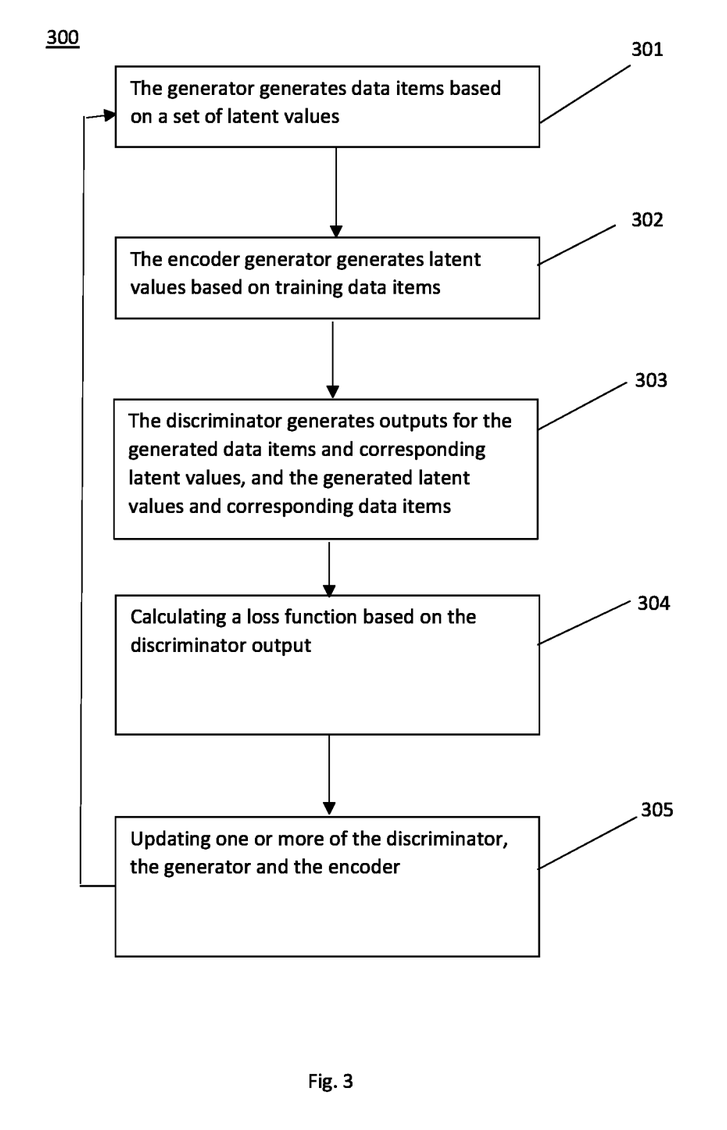
FIG. 3 shows the steps of a method of jointly training the encoder and generator of FIG. 1 and the discriminator of FIG. 2.

Turning to FIG. 3, a method 300 is shown for jointly training the encoder 11, generator 12 and discriminator 21. The method can be performed by one or more computers at one or more locations. The method 300 comprises repeated performing the set of steps 301-305 of the method until a termination criterion is reached (e.g., the number of iterations reaches a predetermined value). Each performance of the set of steps 301-305 is referred to as an iteration. Steps 304 and 305 may be performed by an update unit (e.g., a general purpose computer) configured to modify the encoder 11, generator 12 and discriminator 21. Initially, the network parameters of the encoder 11, generator 12 and discriminator 21 are set to corresponding initiation values, which may for example be all the same.

In a step 301, the generator 12 obtains a batch of latent values, and generates corresponding sample data items, based on its current network parameters.

In a step 302, the encoder 11 obtains a mini-batch of training data items, and for each generates a respective set of latent values, based on its current network parameters.

In step 303, the data item-latents pairs generated in step 301 and the data item-latents pairs generated in step 302 are successively input to the discriminator 21, and the summation unit 22 generates a respective loss for each data item-latents pair.

In step 304 the update unit estimates the current values of $\mathcal{L}_{\in\mathcal{G}}$ and/or $\mathcal{L}_D$ based on losses output by the summation unit 22 in step 303.

In step 305, the update unit updates at least one network parameter of one or more of the encoder 11, generator 12 and discriminator 21 according to conventional machine learning techniques, such as backpropagation. An update to the network parameters Y and Ξ of ∈ and $\mathcal{G}$ is such as to reduce the loss function $\mathcal{L}_{\in g}$, and an update to the projections, $\theta_x$, $\theta_z$ and $\theta_{xz}$ (i.e., the network parameter of the corresponding linear network layers) or to the network parameters Ψ, Φ and Θ of F, H and J is such as to reduce the loss function $\mathcal{L}_D$. Optionally, in alternate iterations of the set of steps 301-305, step 305 may be performed as (i) a joint update to the network parameters Y and Ξ of Θ and $\mathcal{G}$, or (ii) a joint update to the projections, $\theta_x$, $\theta_z$ and $\theta_{xz}$ and the network parameters Ψ, Φ and Θ of F, H and J. Note that in a variant, the projections, $\theta_x$, $\theta_z$ and $\theta_{xz}$ may be selected (e.g., randomly) before the method 300 is performed and not varied during it.

The update may be done, for example, for each iteration except the first, by comparing the current values of $\mathcal{L}_{\in}\mathcal{G}$ and $\mathcal{L}_D$ to the values obtained in the last iteration to estimate the gradients of $\mathcal{L}_{\in}\mathcal{G}$ and $\mathcal{L}_D$ with respect to the corresponding network parameters (i.e., the gradients of loss function $\mathcal{L}_{\in}\mathcal{G}$ with respect to the network parameters Y and Ξ of ∈ and $\mathcal{G}$, and the gradients of loss function $\in_D$ with respect to the projections, $\theta_x$, $\theta_z$ and $\theta_{xz}$ and the network parameters Ψ, Φ and Θ of F, H and J), and calculating the update values for each of the network parameters based on the corresponding respective gradient with respect to that parameter. In the first iteration, the update values may be obtained randomly. Alternatively, steps 301-304 may be performed in each iteration not only in respect of the current values of the network parameters of the encoder 11, generator 12 and discriminator 21 but also in respect of one or more supplemental sets of those network parameters which are respectively displaced from the respective current values of the network parameters by a displacement amount, and in step 305 the gradient of the of $\mathcal{L}\mathcal{G}$ and $\mathcal{L}_D$ with respect to the corresponding network parameters may be estimated by comparing the values of $\mathcal{L}_{\in}\mathcal{G}$ and $\mathcal{L}_D$ for the current network parameters and the supplemental set(s) of those network parameters.

Figure 4:
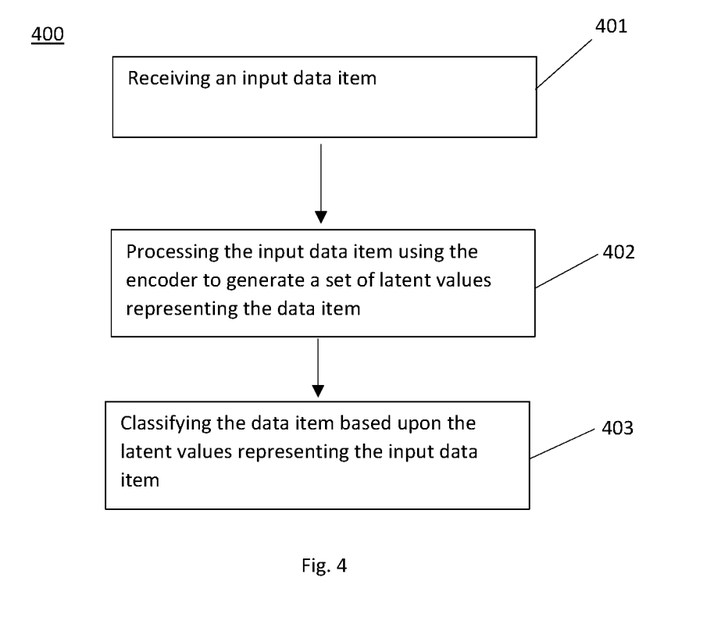
FIG. 4 shows the steps of a first method employing the trained encoder.

Turning to FIG. 4, a first method 400 employing the trained encoder 11 is shown. The method can be performed by one or more computers at one or more locations. In step 401 the encoder receives a data item (e.g., comprising an image such as an image of the real world captured by a camera, and/or a sequence of images such as a video sequence captured by a video camera, and/or an utterance captured with a microphone). In step 402, the encoder 11 processes the input data item, to generate a corresponding set of latent values representing the data item.

In step 403, the encoder 11 classifies the data item based on latent values. The classification step 403 may be performed in multiple ways, e.g., by determining which of a plurality of predetermined regions in the space of the latent values the set of latent values obtained in step 402 falls into, and classifying the data item into a class associated with the determined region.

The sets of predetermined regions may be obtained in multiple ways. For example, they may have been obtained by performing steps equivalent to steps 401-402 in respect of multiple images, and subjecting the resulting multiple sets of latent values to an automatic clustering algorithm, thereby identifying a plurality of clusters in the space of the set of latent values, with each of the multiple sets of latent values being associated with one of the clusters, and defining each of the predetermined regions based on the sets of latent values which are associated with a respective one of the clusters.

Alternatively, sets of predetermined regions in the space of latent values associated with respective predetermined classes may be obtained using multiple labelled data items (that is, each data item is associated with a set of label data which indicates one or more of a predetermined plurality of classes which the data item falls into). The encoder 11 performs steps equivalent to steps 401-402 in respect of each of the labelled data items, and defines a predetermined region for each of the classes as a region in the space of latent values which contains the data items labelled with label data indicating that class. This may be done by training a classification unit (e.g., a neural network classification unit) such as a linear classifier based on the outputs of the trained encoder 11 for each of the labelled data items, and the corresponding label data. Thus, although the encoder 11 was trained in method 300 with unlabeled data items (or at any rate, the labels were typically not used in training the encoder 11), labelled data items may be used subsequently to train the classifier unit. This makes it possible to obtain high quality classification even if the number of available labelled data items is small, e.g., because they are obtained by manually labelling a proportion of a large database of data items. That is because the number of labelled data items required to train the classifier unit will be small, assuming that the classifier unit includes far fewer network parameters than the encoder 11.

Note that the regions in the space of latent values associated with the respective classes may be overlapping, e.g., if the classes are not mutually exclusive. For example, if the classes were "winter", "summer", "mountain", "valley", and if the data items were images of mountains or valleys captured in winter or summer, then the label data for each data item might indicate a corresponding one of the classes "winter" or "summer", and a corresponding one of the classes "mountain" or "valley", and the predetermined regions corresponding to the classes "winter" and "summer", while probably not overlapping with each other, may each overlap with the predetermined region corresponding to the classes "mountain" and "valley".

Experiments relating to method 300 were performed using data items which were 128×128 images, and the set of latent values for each data item included 120 elements. The structures of the generator 12 and the sample discriminator sub-network 211 were as used in the "BigGAN" framework. The latent discriminator sub-network 212 and joint discriminator sub-network 213 were 8-layer MLPs with ResNet-style skip connections (four residual blocks with two layers each) and size 2048 hidden layers. The architecture of the encoder 11 was a ResNet-v2-50 ConvNet follows by a 4-layer MLP (with a size of 4096 per layer) with skip connections (two residual blocks) after ResNet's globally average pooled output.

The encoder 11 was configured to generate outputs with a distribution $\mathcal{N}(\mu, \sigma)$. The encoder 11 comprised a linear output layer which determines the mean and also determines a value $\tilde{\sigma}$ which is related to a by a non-negative "soft-plus" non-linearity $\sigma = \log(1+\exp(\tilde{\sigma}))$. The set of latent values z were generated based upon a reparameterized sampling.

Specifically, each component of z was generated as $z=\mu+\text{epsilon}*\sigma$, with epsilon being sampled from a unit Gaussian having zero mean. Alternatively, the latent values may be based upon a discrete probability distribution.

Experimentally, it was found that omitting the sample discriminator sub-network 211 degraded the performance more than omitting the latent discriminator sub-network 212, but the discriminator 21 performed best if it included both these discriminator sub-networks 211, 212. The sample discriminator sub-network 211 has large positive effect on the performance of the trained generator 12, and marginally leads to a slightly improved performance of the linear classifier. The presence of the latent discriminator sub-network 212 leads to an improvement in the performance of the linear classifier which depends upon the distribution $P_z$.

It was found that efficient use of computational resources was achieved when the training data items x in the training database and received by the encoder 11 have more components than the data items x̂ generated by the generator 12. In this case, when a data item-latents pair of the type (x, ẑ) is to be fed to the discriminator 21, the training data item x is first downsampled to match the resolution of the data items x̂ generated by the generator 12. In this way, it was possible, with high computational efficiency, to generate an encoder 11 which permitted accurate classification of high resolution images without requiring the generator 12 and discriminator 21 to be capable to generating/receiving such high resolution images, and thus the computational time required to train the encoder 11, generator 12 and discriminator 21 was reduced. Note that in the experiments, the number of latent values generated by the encoder 11 was the same as the number of latent values input by the generator 12 and the discriminator 21.

Although as explained above, the training data items are typically not labelled, in a further variation of the training method, which may be used in the case that the training data items are associated with corresponding label data, the set of latent values generated by the encoder upon receiving a given data item may include one or more components which label the data item as belonging to one or more of a set of predetermined categories. For example, in the case of a data item-latents pair where the data item is a labelled training data item, the latent values the encoder generates from the labelled training data item may be a plurality of (e.g., normally-distributed) latent variables concatenated with a categorical variable for the data item. The encoder is trained, e.g., by adding an extra term to the loss function, to make the categorical variable equal to a value derived from the label data for the training data item. The categorical variable may, for example, be a variable which labels the data item as being in one of a plurality of predetermined categories, e.g., 1024 categories. In the case of a data item-latents pair where the data item is generated by the generator 12, the latent values received by the generator 12 comprise latent values of the kind described above (e.g., from a normal distribution) concatenated with a value for the categorical variable. In this way the generator neural network may learn a clustering of the data items and the encoder neural network may learn to classify the data items (i.e., the classification is performed by the encoder 11 rather than using a classifier based on the output of the encoder 11).

Figure 5:
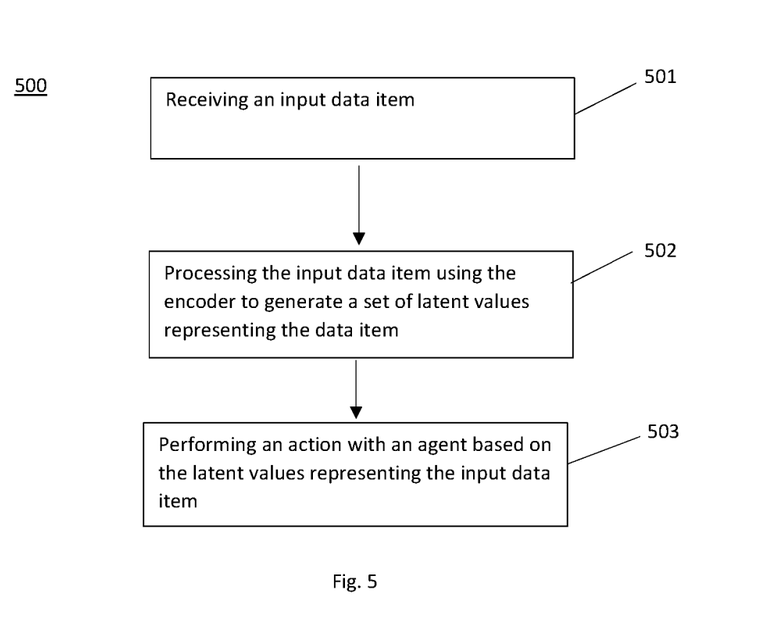
FIG. 5 shows the steps of a second method employing the trained encoder.

Turning to FIG. 5, a second method 500 employing the trained encoder 11 is shown. The method can be performed by one or more computers at one or more locations. In step 501 the encoder receives a data item (e.g., comprising an image such as an image of the real world captured by a camera, and/or a sequence of images such as a video sequence captured by a video camera, and/or an utterance captured with a microphone). In step 502, the encoder 11 processes the input data item, to generate a corresponding set of latent values representing the data item.

In step 503, a control unit uses the set of latent values to generate control data for controlling an agent, and transmits the control data to the agent to cause the agent to perform an action. The agent may be any of the types of agents discussed above, e.g., a robot. The agent interacts with an environment, such as by moving in an environment (the term "moves" is used to include both translation of the agent from one location in the environment to another, and/or reconfiguration of components of the agent without necessarily including translation of the agent) and/or by moving objects within the environment. The environment may be real world environment, and the data item may be data collected by one or more sensors (e.g., a microphone or a camera, such as a video camera) and describing the environment.

The process of generating the control data based on the set of latent values may be based on a policy. The policy may be trained by any known technique from the field of reinforcement learning, such as based on reward values which indicate how well actions by the agent contribute to performing a specific task.

Figure 6:
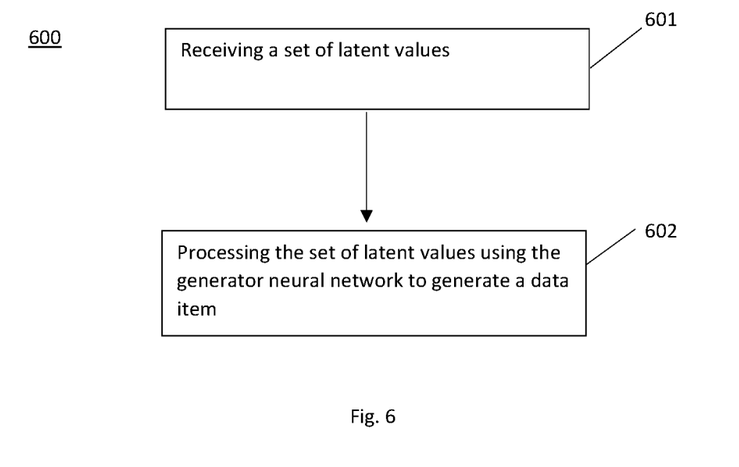
FIG. 6 shows the steps of a method employing the trained generator.

Turning to FIG. 6, a method 600 employing the trained generator 12 is shown. The method can be performed by one or more computers at one or more locations. In step 601 the generator 12 receives a set of latent values. In step 602 the generator 12 processes the set of latent values to generate a corresponding data item.

Suppose a user wishes to compress a data item. This may be done by using the encoder to generate a set of latent values with many fewer elements than the data item (e.g., a factor of at least 100 smaller, or of at least 1000 smaller). The data item may then be regenerated by employing the set of latent values in the method of FIG. 6. Though the regenerated data item will differ from the original data item which was received by the encoder 11, it may contain the same salient information (e.g., if the original data item is an image of a dog, the regenerated one is also an image of a dog) and may hardly be distinguishable from a data item drawn from the training database. This effect was verified experimentally.

Suppose, in another example, that a user wishes to obtain a data item which combines the characteristics of two (or more) existing data items. In a preliminary step, the user may process the two data items with the encoder 11 to generate corresponding sets of latent values, then form new set of latent values based on the two sets of latent values (e.g., each latent value in the new set may be the mean of the corresponding latent values in the two sets of latent values), and use the new set of latent values in step 601 of the method. The generator 12 outputs a data item having characteristics of both the original data items, and which is hardly distinguishable from a data item drawn from the training database.

In another example, suppose that the space of latent values has been partitioned into regions in the manner discussed above in relation to FIG. 4, with the different regions corresponding to respective classes. A user who wishes to generate a data item which is in one or more of the classes may select a set of latent values which are within the corresponding region(s), and use that as the set of latent values in step 601 of the method.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows can be performed by and apparatus can also be implemented as a graphics processing unit (GPU).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method of training a generator neural network and an encoder neural network,
    wherein the generator neural network is configured to generate, based on a set of latent values, data items which are samples of a distribution representing a set of training data items;
    wherein the encoder neural network is configured to generate a set of latent values for a respective data item;
    wherein the method comprises jointly training the generator neural network, the encoder neural network and a discriminator neural network configured to distinguish between samples generated by the generator network and samples of the distribution which are not generated by the generator network, and
    wherein the joint training comprises:
    generating, using the encoder neural network, a set of latent values;
    generating, from the set of latent values generated by the encoder neural network, an output data item using the generator neural network;
    processing an input pair comprising the set of latent values generated by the encoder neural network and the output data item generated by the generator neural network using the discriminator neural network to generate (i) based on the set of latent values and the output data item, a first score that indicates whether the output data item in the input pair is a sample generated by the generator network or a sample of the distribution which is not generated by the generator network and (ii) based on the set of latent values and not on the output data item, a second score that indicates whether the set of latent values in the input are generated by the encoder neural network or sampled from a latent probability distribution; and
    training the generator neural network and the encoder neural network on a loss function comprising a joint discriminator loss term based upon the first score that indicates whether the output data item in the input pair is a sample generated by the generator network or a sample of the distribution which is not generated by the generator network and a first single discriminator loss term based upon the second score that indicates whether the set of latent values in the input are generated by the encoder neural network or are sampled from a latent probability distribution.

2. The method of claim 1, wherein the loss function further comprises a second single discriminator loss term that is based upon a third score that indicates whether the output data item in the input pair is a sample generated by the generator network or a sample of the distribution which is not generated by the generator network.

3. The method of claim 2, wherein the third score is generated based upon processing the output data item of the input pair using a sample discriminator sub-network of the discriminator neural network.

4. The method of claim 3, wherein the third score is further generated based upon applying a projection to an output of the sample discriminator sub-network.

5. The method of claim 3, wherein the sample discriminator sub-network is based upon a convolutional neural network.

6. The method of claim 1, wherein the second score is generated based upon processing the set of latent values of the input pair using a latent discriminator sub-network of the discriminator neural network.

7. The method of claim 6, wherein the second score is further generated based upon applying a projection to an output of the latent discriminator sub-network.

8. The method of claim 6, wherein the latent discriminator sub-network is based upon a multi-layer perceptron.

9. The method of claim 1, wherein the first score is generated using a joint discriminator sub-network of the discriminator neural network.

10. The method of claim 9, wherein the joint discriminator sub-network is configured to process an output of a sample discriminator sub-network and an output of a latent discriminator sub-network, wherein the sample discriminator subnetwork is configured to process the output data item of the input pair and the latent discriminator sub-network is configured to process the latent values of the input pair.

11. The method of claim 10, wherein the joint discrimination score is further generated based upon applying a projection to an output of the joint discriminator sub-network.

12. The method of claim 10, wherein the joint discriminator sub-network is based upon a multi-layer perceptron.

13. The method of claim 1, wherein the loss function is based upon a summation of at least the joint discriminator loss term and the single discriminator loss term.

14. The method of claim 1, wherein the loss function comprises a hinge function applied to a component of the loss function.

15. The method of claim 1, wherein the encoder neural network generates an output that represents a probability distribution and generating a set of latent values comprises sampling from the probability distribution.

16. The method of claim 15, wherein the output of the encoder neural network has a mean and standard deviation for defining a normal probability distribution.

17. The method of claim 15, wherein the set of latent values is generated based upon a reparameterized sampling.

18. The method of claim 1, wherein the encoder neural network is based upon a convolutional neural network.

19. The method of claim 1, wherein the training further comprises alternating updates of the discriminator neural network parameters and updates of the encoder neural network parameters and generator neural network parameters, wherein the updates are generated based upon the loss function.

20. The method of claim 1, wherein the training further comprises jointly updating the encoder neural network parameters and generator neural network parameters.

21. The method of claim 19, wherein alternating updates of the discriminator neural network parameters and updates of the encoder neural network parameters and generator neural network parameters comprises performing a plurality of updates of the discriminator neural network parameters followed by an update of the encoder neural network parameters and generator neural network parameters.

22. A method of performing inference using an encoder neural network, the method comprising:
processing an input data item using the encoder neural network to generate a set of latent values representing the input data item;
wherein the encoder neural network is jointly trained with a generator neural network configured to generate, based on a set of latent values, data items which are samples of a distribution representing a set of training data items, and a discriminator neural network configured to distinguish between samples generated by the generator network and samples of the distribution which are not generated by the generator network; and
wherein the joint training comprises:
generating, using the encoder neural network, a set of latent values;
generating, from the set of latent values generated by the encoder neural network, an output data item using the generator neural network;
processing an input pair comprising the set of latent values generated by the encoder neural network and the output data item generated by the generator neural network using the discriminator neural network to generate (i) based on the set of latent values and the output data item, a first score that indicates whether the output data item in the input pair is a sample generated by the generator network or a sample of the distribution which is not generated by the generator network and (ii) based on the set of latent values and not on the output data item, a second score that indicates whether the set of latent values in the input are generated by the encoder neural network or sampled from a latent probability distribution; and
training the generator neural network and the encoder neural network on a loss function comprising a joint discriminator loss term based upon the first score that indicates whether the output data item in the input pair is a sample generated by the generator network or a sample of the distribution which is not generated by the generator network and a first single discriminator loss term based upon the second score that indicates whether the set of latent values in the input are generated by the encoder neural network or are sampled from a latent probability distribution.

23. The method of claim 22, further comprising:
classifying the input data item based upon the latent values representing the input data item.

24. The method of claim 22, further comprising:
performing an action with an agent based upon the latent values representing the input data item.

25. A method of generating a data item using a generator neural network, the method comprising:
receiving a set of latent values;
processing the set of latent values using the generator neural network to generate a data item;
wherein the generator neural network is jointly trained with an encoder neural network configured to generate a set of latent values for a respective data item and a discriminator neural network configured to distinguish between samples generated by the generator network and samples of the distribution which are not generated by the generator network;
wherein the generator neural network is configured to generate, based on a set of latent values, data items which are samples of a distribution representing a set of training data items; and
wherein the joint training comprises:
generating, using the encoder neural network, a set of latent values;
generating, from the set of latent values generated by the encoder neural network, an output data item using the generator neural network;
processing an input pair comprising the set of latent values generated by the encoder neural network and the output data item generated by the generator neural network using the discriminator neural network to generate (i) based on the set of latent values and the output data item, a first score that indicates whether the output data item in the input pair is a sample generated by the generator network or a sample of the distribution which is not generated by the generator network and (ii) based on the set of latent values and not on the output data item, a second score that indicates whether the set of latent values in the input are generated by the encoder neural network or sampled from a latent probability distribution; and
training the generator neural network and the encoder neural network on a loss function comprising a joint discriminator loss term based upon the first score that indicates whether the output data item in the input pair is a sample generated by the generator network or a sample of the distribution which is not generated by the generator network and a first single discriminator loss term based upon the second score that indicates whether the set of latent values in the input are generated by the encoder neural network or are sampled from a latent probability distribution.

* * * * *